Sept. 18, 1934.  A. R. THOMPSON  1,974,128

METHOD AND APPARATUS FOR DRYING FRUIT

Filed Dec. 17, 1930  2 Sheets-Sheet 1

INVENTOR.
Albert R. Thompson.
BY Philip A. Minnis
ATTORNEY

Patented Sept. 18, 1934

1,974,128

UNITED STATES PATENT OFFICE 1,974,128

METHOD AND APPARATUS FOR DRYING FRUIT

Albert E. Thompson, San Jose, Calif., assignor to Food Machinery Corporation, San Jose, Calif., a corporation of Delaware Application December 17, 1930, Serial No. 502,946

17 Claims. (Cl. 34—12)

This invention relates to a method and apparatus for drying articles of a more or less globular nature, and has been found to have particular utility in drying fruit and the like. It will be understood, of course, that although for the sake of convenience of description I shall describe the invention in connection with its application to the drying of fruit, it is not so limited but may be used with other articles as will be apparent.

Fruit as brought from the orchard is usually too dirty for consumption prior to cleansing and, moreover, as is well known, it is customary practice to spray fruit trees and the growing fruit with various kinds of poisonous liquids for the purpose of avoiding the ravages of insects and the attacks of certain fungus growths. In order to eliminate the dirt and the spray residue which is poisonous to human beings as well as to insects, it is necessary that the fruit be thoroughly washed before packing. After the washing operation and prior to packing, it is necessary to thoroughly dry the fruit since to pack wet fruit would promote decay and in many cases tissue paper wrappers are wrapped around the individual pieces of fruit which would be destroyed if wet fruit were wrapped in them.

The drying is usually accomplished by mechanical means and such apparatus as used at the present time ordinarily drys the fruit by subjecting it to the wiping action of brushes or absorbent wipers, or removes the moisture by blowing it off or evaporating it by passing a blast of hot air over the fruit. Although these various methods have met with more or less satisfactory results, many difficulties have been met with. For example, it has been found that where brushes or wipers are used, after a short period of operation they become so saturated that it is impossible to dry them while the apparatus continues in service and consequently they do not efficiently dry the fruit thereafter. In apparatus which utilizes air blasts or heat, the construction is necessarily complicated and expensive.

I have found that by utilizing my method these difficulties are avoided and the fruit is not only efficiently dried, but apparatus for carrying out the method can be of simpler construction and cheaper to build and operate than apparatus heretofore known. Moreover, my method is particularly well adapted for use in conjunction with present methods of drying and when so used results in a material increase in efficiency of those methods in addition to permitting the use of much simpler and cheaper apparatus for carrying out the process.

The method of drying fruit according to my invention constitutes a radical departure from previous practice in that the drying is not dependent upon absorption, evaporation, or pneumatic displacement of the moisture from the fruit, but takes advantage of the highly water repellant characteristics of fruit skins. The exterior surface of most fruit skins is naturally more or less oily or gummy and for this reason, when the fruit is wet, the moisture tends to collect upon its surface in the form of small droplets or globules. I have discovered that this moisture can be removed from the fruit by subjecting it to rolling contact with a suitable surface of such character that as the fruit rolls over it a portion of the liquid will be transferred to such surface and adhere thereto in the form of free surface moisture, and that by the utilization of this principle the moisture can be rapidly and effectively removed from the fruit by subjecting it to rolling contact on various axes with one or more of such surfaces while removing the transferred moisture from such surface whereby the moisture removing the efficiency of its fruit contacting portions is maintained during repeated contacts with the fruit by employing a substantially non-absorbent surface. For this purpose the moisture may be readily and effectively removed therefrom without danger of the surface becoming saturated and thereby resulting in decreased moisture removing efficiency.

It is, therefore, an object to provide a method of drying fruit and the like without the use of brushes, blowers, heaters, absorptive means and the like, and to provide an apparatus for carrying out the method which shall be of simpler construction, so that it is inexpensive to build and operate.

More specifically, it is an object to provide a method and apparatus for removing moisture from the surfaces of fruit and the like in which the fruit is subjected to rolling contact with a surface to which moisture may be transferred from the contacting fruit surfaces, and of a substantially non-absorbent nature so that moisture transferred thereto will adhere thereon as free surface moisture, and from which surface the moisture is in turn removed so as to maintain the ability of such surface to remove moisture from contacting fruit surfaces during repeated contacts with the fruit.

Other objects and advantages will be apparent by reference to the accompanying drawings, in which.

Like reference characters refer to like parts throughout the several views.

Figure 1:
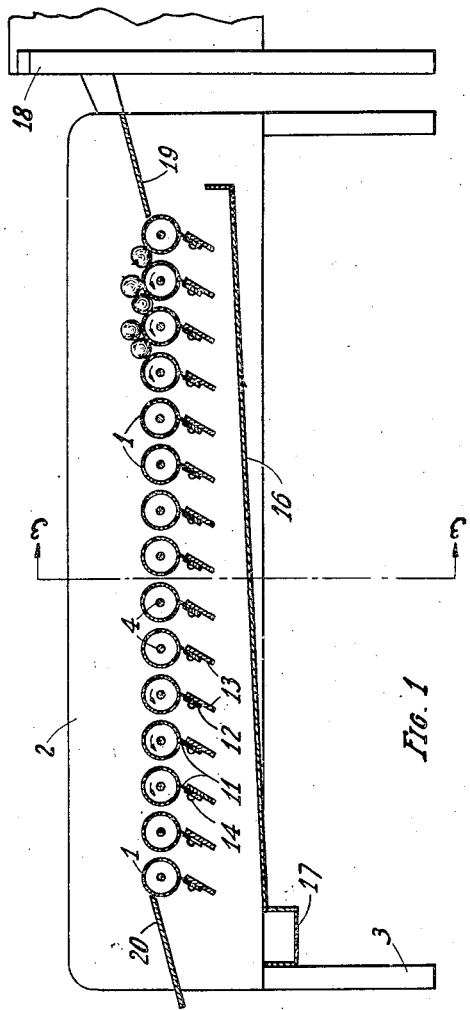
Figure 1 is a sectional view taken along the line 1—1 of Figure 2, illustrating an apparatus constructed in accordance with my invention and illustrating it as used in connection with a fruit washer.

The apparatus illustrated comprises a series of horizontally disposed supporting rollers 1, arranged in parallel relation and mounted intermediate a pair of side walls 2, so as to form a runway for fruit to be dried. The apparatus is supported upon suitable legs 3. In the construction shown, the rollers are formed of cylindrical brass tubes fixed to shafts 4 which are journaled in the bearings 5 carried by the side walls. Provision is made for driving all the rollers in the same direction by means of the drive shaft 6, supported in bearings 7 to one side of the apparatus, the driving shaft having a series of bevel gears 8 keyed thereto, each of which co-operates with a corresponding gear fixed to the outer end of a roller shaft 4. Power may be supplied from any suitable source to the pulley 10.

Although for lightness and economy I have made use of brass tubes, it will be apparent that they may be made solid if desired and they may be formed of other materials than brass, such as for example, iron, steel, glass, rubber or other materials preferably of a substantially non-absorbent nature if most efficient results are to be obtained. In some instances it may be desirable to use ordinary wooden or fibre rollers which may have their outer surfaces varnished, lacquered, or enameled.

For removing the moisture adhering to the rollers, a squeegee is positioned beneath each roller and preferably contacts with the roller across its entire width. The squeegees comprise rubber strips 11 securely fixed to holding members 12, mounted on transverse supports 13, extending between the side walls 2. Verticle adjustment of the squeegee is provided for by securing the holding members 12 to the supports 13 by means of bolts 14 passing through the slots 15 in the holding members. By this construction, the squeegees may be adjusted so as to regulate their pressure against the rollers to compensate for wear. The water removed from the rollers by the squeegee drips down upon the inclined drip pan 16, which directs it to the trough 17, from which it may be discharged to any desired point of drainage.

In operation, after the fruit has been washed by any suitable means, such as the washer whose discharge end is illustrated at 18, the wet fruit is fed to the dry rollers over the ramp 19 where it tends to collect in the grooves between adjacent rollers. As long as no more fruit is added the pieces in the grooves will remain there, being continually rotated in contact with the rollers, so that as heretofore explained, the moisture adhering to the fruit is transferred to the non-absorbent surfaces of the rollers whereon it adheres in the form of free surface moisture and from where it is immediately removed by the squeegee underneath, so that a dry surface is repeatedly presented to the fruit. As other pieces of fruit are fed to the drying rolls, their weight against the fruit in the grooves causes enough added friction so that the pieces in the first groove are displaced and advanced over the top of the second roller into the next groove. Any fruit which may be in the second groove is thereupon displaced by this fruit so that it advances to the third grooves. In this manner, as fruit is fed to the drying rollers it is advanced thereover from one groove to another until all the moisture is removed and the fruit is finally discharged from the apparatus over the discharge ramp 20.

It has been found in practice that it is not necessary to drive the rollers at a high rate of speed and it will be seen that as the fruit is advanced over the tops of the rollers from one groove to the next, there is a tendency for each piece to pause on the top of the roller. At this point the frictional contact with other pieces of fruit advancing over the rollers will cause the fruit to turn about more or less so that when it falls onto the next groove it will rotate upon a different axis than it did in the previous groove. In this manner, as the fruit is advanced over the rollers, its axis of rotation is continually changing, so that all parts of its surfaces come into contact with the rollers and it is thereby effectually dried. This twisting action is very readily observed when more elongated fruits, such as lemons, are passed over the rollers. When the lemons rest in the grooves, since they have two points of frictional contact with the rollers, they tend to rotate upon their longer axes, but as they are displaced from one groove to another by the addition of other pieces, and rise to the top of the rollers, they contact with other pieces simultaneously advancing over the rollers which, coupled with the lessened frictional contact with the rollers causes them to turn and roll end for end.

It has thus been demonstrated that the fruit is continually rolled upon different axes as it passes through the machine regardless of its shape, whether spheroidal or ellipsoidal, so that substantially all parts of the surface come in contact with the rollers.

As has been pointed out previously, it may be desirable in some instances to combine the method herein disclosed with existing methods, and for this purpose a dryer may be constructed embodying the features of both. Such an apparatus is illustrated in Figure 4 in which the fruit may be first subjected to the drying action of non-absorbent surfaces and thereafter subjected to a blast of air.

Figure 2:
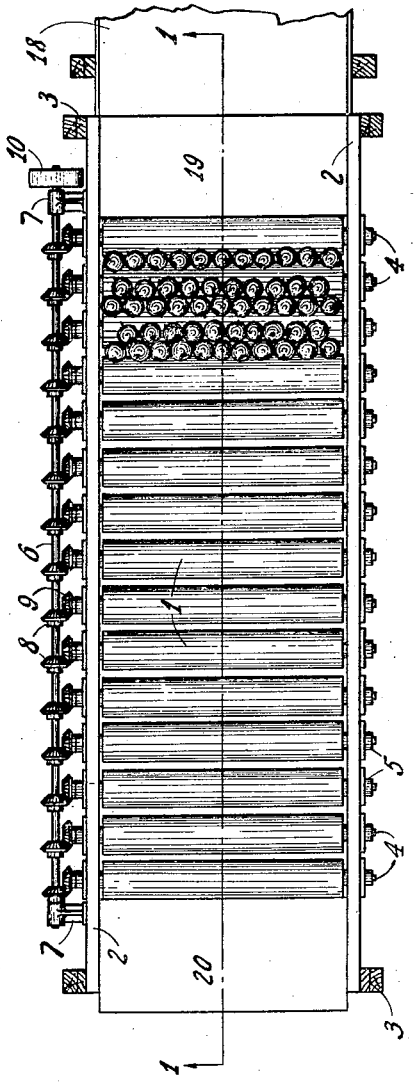
Figure 2 is a plan view of the apparatus illustrated in Figure 1.
Figure 3:
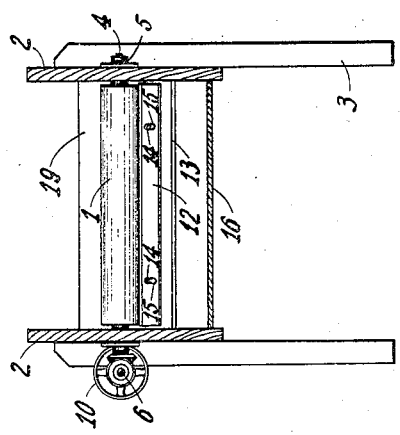
Figure 3 is a sectional view as taken along the line 3—3 of Figure 1.
Figure 4:
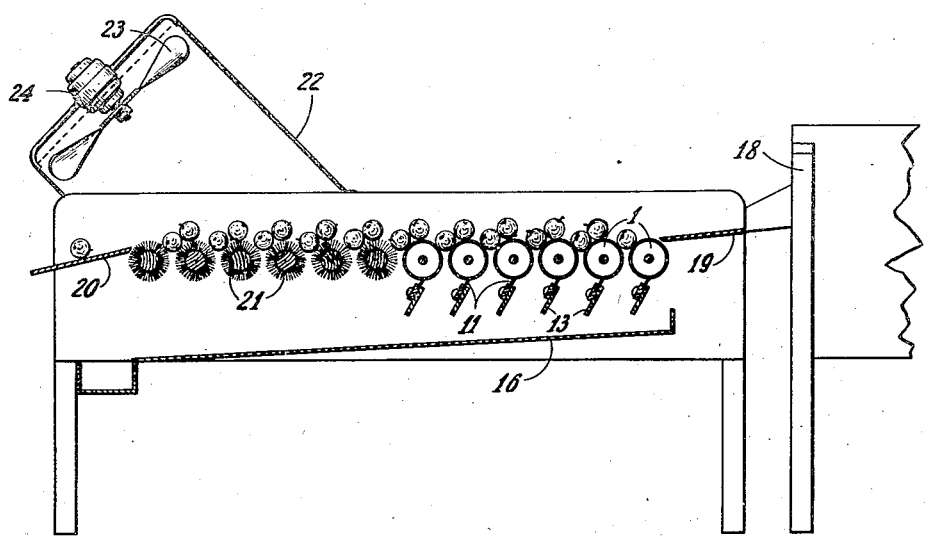
Figure 4 is a sectional view of a modified form of apparatus.

In the apparatus shown in Figure 4 the fruit is delivered from the washer 18 into the drier over the ramp 19 and onto the drying rollers 1, which are of the same construction as the rollers shown in Figures 1, 2, and 3, and which are provided with squeegees 11, also similar to those previously described. As the fruit advances through the machine it passes onto a set of brushes 21, having absorbent qualities, mounted under an overlying hood or enclosure 22. A fan 23 mounted in the hood over the brushes 21 may be driven in any suitable manner such as by an electric motor 24 so as to deliver a blast of air over the fruit passing under the hood. The action of the air blast and the brushes 21 on the fruit which has already been subjected to the preliminary drying operation of the rollers 1 serves to completely dry it, and the dry fruit is discharged from the apparatus over the discharge ramp 20. The brushes 21 also serve to impart a polish to the fruit, which is a desirable characteristic.

Among the advantages of the type of machine just described is that a shorter machine may be used than heretofore and it may be run at a higher speed so that increased capacity results. Moreover, the efficiency of the brushing section is greatly increased since, by reason of the preliminary drying effected by the non-absorbent rollers, the brushes do not absorb moisture at a high enough rate to impair their efficiency.

In cases where apparatus of the absorbent type is in use at the present time, it will be seen that the efficiency of such apparatus may be greatly increased at comparatively small expense and without the necessity of entirely discarding the apparatus, simply by adding a section of apparatus constructed according to my invention so that a preliminary drying is effected and consequently saturation of the absorbent means is avoided. Moreover, a large part of the existing apparatus may be dispensed with if desired by reason of the increased efficiency.

It will be understood that various changes and modifications may be made in the method and apparatus herein disclosed without departing from the spirit or scope of my invention. For example, in some cases it may be desirable to lengthen the rollers and incline them so that the fruit can be fed from the side parallel to the rollers instead of transversely thereto and I deem myself entitled to all such variations and modifications as fall within the scope of the claims appended hereto.

Having now described my invention and in what manner the same may be used and what I claim as new and desire to protect by Letters Patent is:

1. A machine for removing moisture from the surfaces of fruit and the like including a revoluble fruit engaging element having a surface to which moisture may be transferred from the surfaces of fruit contacting therewith and of a substantially non-absorbent nature so that moisture transferred thereto will adhere thereon as free surface moisture, means for driving said fruit engaging element, means for supporting pieces of fruit in rolling contact with said fruit engaging element, and means disposed to engage the surface of said fruit engaging element simultaneously with the fruit for removing adhering moisture from said surface to maintain its ability to receive and remove moisture from contacting fruit surfaces during repeated contacts with the fruit.

2. A machine for removing moisture from the surfaces of fruit and the like including a revoluble moisture removing element having a smooth metal surface to which moisture may be transferred from the surfaces of fruit contacting therewith and adhere thereon as free surface moisture, means for driving said moisture removing element, means for supporting pieces of fruit in rolling contact therewith, and means for simultaneously removing adhering moisture from the surface of said fruit engaging element as the fruit contacts therewith, by bodily displacing said moisture therefrom.

3. A machine for removing moisture from the surfaces of fruit and the like, having means upon which the fruit may be supported and advanced, including a plurality of revoluble fruit supporting rolls arrange in parallel spaced relation to support and rotate pieces of fruit therebetween, said rolls having surfaces to which moisture may be transferred from the surfaces of fruit contacting therewith, and of a substantially non-absorbent nature so that moisture transferred thereto will adhere thereon as free surface moisture, means for driving said rolls in a common direction to subject the fruit to rolling contact therewith, and means disposed out of the path of the fruit and engaging with the surfaces of said rolls for removing adhering moisture therefrom to maintain their ability to receive and remove moisture from contacting fruit surfaces during repeated contacts with the fruit.

4. A machine for removing moisture from the surfaces of fruit and the like, having means upon which the fruit may be supported and advanced, including a plurality of revoluble fruit supporting rolls arranged in side by side relation to support pieces of fruit therebetween, said rolls having surfaces to which moisture may be transferred from the surfaces of fruit contacting therewith, and of a substantially non-absorbent nature so that moisture transferred thereto will adhere thereon as free surface moisture, means for driving said rolls in a common direction to subject the fruit to rolling contact therewith, a squeegee associated with each of said rolls for removing adhering moisture therefrom, and means for holding said squeegees in operative engagement with the surfaces of said rolls.

5. A machine for removing moisture from the surfaces of fruit and the like, including a plurality of revoluble smooth surfaced fruit supporting elements arranged in side by side spaced relation to support and rotate pieces of fruit therebetween, said supporting elements having surfaces to which moisture may be transferred from the surfaces of fruit contacting therewith, and of a substantially non-absorbent nature so that moisture transferred thereto will adhere exteriorly thereof in unabsorbed form, means for driving said supporting elements in a common direction to subject the fruit to repeated rolling contact therewith, and means disposed out of the path of the fruit to engage with the surfaces of said supporting elements simultaneously with the fruit for removing adhering moisture from said supporting element surfaces, to maintain the ability of said surfaces to receive and remove moisture from contacting fruit surfaces during said repeated contacts with the fruit.

6. A machine for removing moisture from the surfaces of fruit and the like, including a plurality of revoluble fruit supporting rolls arranged in side by side relation to support pieces of fruit therebetween, said rolls having surfaces to which moisture may be transferred from the surfaces of fruit contacting therewith and of a substantially non-absorbent nature so that moisture transferred thereto will adhere thereon as free surface moisture, means for driving said rolls in a common direction to subject the fruit to rolling contact therewith, and means disposed to operatively engage the surfaces of said rolls simultaneously with the fruit to remove adhering moisture from said roll surfaces and maintain their ability to receive and remove moisture from contacting fruit surfaces during repeated contacts with the fruit.

7. A machine for removing moisture from the surfaces of fruit and the like, having means upon which the fruit may be supported and advanced, including a plurality of revoluble fruit supporting rolls arranged in side by side relation to support pieces of fruit therebetween, said rolls having smooth metal surfaces to which moisture may be transferred from the surfaces of fruit contacting therewith and adhere thereon as free surface moisture, means for driving said rolls in a common direction to subject the fruit to rolling contact therewith, and means disposed out of the path of the fruit and engaging with the surfaces of said rolls for removing adhering moisture therefrom to maintain their ability to receive and remove moisture from contacting fruit surfaces during repeated contacts with the fruit.

8. In a machine for removing moisture from the surfaces of fruit and the like, a runway upon which the fruit may be supported and advanced therealong, said runway including a revoluble power driven fruit supporting element over which the fruit is passed in contact therewith, and having a substantially non-absorbent surface to which moisture may be transferred from the surfaces of fruit contacting therewith and adhere thereon as free surface moisture, means for driving said fruit supporting element, and means disposed out of the path of the fruit and engaging with the surface of said supporting element for removing adhering moisture therefrom to maintain its ability to receive and remove moisture from contacting fruit surfaces during repeated contacts with the fruit.

9. A machine for removing moisture from the surfaces of fruit and the like including a fruit supporting runway upon which the fruit may be supported and advanced, said runway being formed by a plurality of rolls mounted in side by side relation for rotation about fixed axes, said rolls having surfaces to which moisture may be transferred from the surfaces of fruit contacting therewith, and of a substantially non-absorbent nature so that moisture transferred thereto will adhere thereon as free surface moisture, means for rotating said rolls in a common direction, and means disposed out of the path of the fruit for continuously removing adhering moisture from the surfaces of said rolls during contact of the fruit therewith by bodily displacing said moisture therefrom.

10. A machine for removing moisture from the surfaces of fruit and the like including a fruit supporting runway upon which the fruit may be supported and advanced, said runway being formed by a plurality of rolls mounted in side by side relation for rotation about fixed axes, said rolls having surfaces to which moisture may be transferred from the surfaces of fruit contacting therewith, and of a practically non-absorbent nature so that moisture transferred thereto will adhere exteriorly thereof in unabsorbed form, means for rotating said rolls in a common direction, a squeegee associated with each of said rolls for removing adhering moisture therefrom, and means for holding said squeegees in operative engagement with the surfaces of said rolls.

11. In a machine for removing moisture from the surfaces of fruit and the like, a runway upon which the fruit may be supported and advanced therealong, said runway including a plurality of revoluble fruit supporting elements over which the fruit is successively passed in contact therewith, said fruit supporting elements being mounted for operation in fixed location and having surfaces to which moisture may be transferred from the surfaces of fruit contacting therewith and of a substantially non-absorbent nature so that moisture transferred thereto will adhere thereon as free surface moisture, means for driving said supporting elements to support the fruit in rolling contact therewith, and means disposed out of the path of the fruit for continuously removing adhering moisture from the surfaces of said supporting elements during contact of the fruit therewith by bodily displacing said moisture therefrom.

12. A process of removing moisture from the surface of fruit and the like, which comprises supporting the fruit in rolling engagement between a pair of circuitously traveling surfaces to which moisture may be transferred from the contacting fruit surfaces and of a substantially non-absorbent nature so that moisture transferred thereto will adhere thereon in the form of free surface moisture, and simultaneously wipingly engaging the fruit contacting portions of said surfaces to remove adhering moisture therefrom and maintain their ability to receive and remove moisture from contacting pieces of fruit during repeated contacts with the fruit.

13. A process of removing moisture from the surface of fruit and the like which comprises subjecting the fruit to rolling contact with a circuitously traveling surface to which moisture may be transferred from the contacting fruit surfaces and of a substantially non-absorbent nature so that moisture transferred thereto will adhere thereon in the form of free surface moisture, and squeegeeing adhering moisture continuously from the fruit engaging portions of said fruit contacting surface during contact of the fruit therewith to maintain its ability to receive and remove moisture from contacting fruit surfaces during repeated contacts with the fruit.

14. A process of removing moisture from the surface of fruit and the like which comprises subjecting the fruit to rolling contact with a circuitously traveling, smooth metallic surface to which moisture may be transferred from the contacting fruit surfaces and adhere thereto in the form of free surface moisture, and simultaneously squeegeeing adhering moisture from said fruit contacting surface to maintain its ability to receive and remove moisture from contacting fruit surfaces during repeated contacts with the fruit.

15. A process of removing moisture from the surfaces of fruit and the like, which comprises subjecting the fruit to rolling engagement with a moving surface to which moisture may be transferred from the contacting fruit surfaces and of a substantially non-absorbent nature so that moisture transferred thereto will adhere thereon in the form of free surface moisture, moving said surface to bring fruit contacting portions thereof repeatedly into and out of contact with the rolling fruit, and wipingly engaging the fruit contacting portions of said surface between successive contacts thereof with the fruit to remove adhering moisture therefrom and maintain its ability to receive and remove moisture from contacting fruit surfaces during repeated contacts with the fruit.

16. A process of removing moisture from the surface of fruit and the like which comprises passing the fruit over a substantially non-absorbent surface to which moisture may be transferred from the contacting fruit surfaces and adhere thereto in the form of free surface moisture, subjecting said fruit to rolling contact with said fruit contacting surface by imparting travel to the latter over a circuitous path so as to cause its fruit contacting portions to repeatedly contact with the fruit, and squeegeeing adhering moisture from the fruit contacting portions of said surface during each cycle of its travel while the fruit is in contact therewith to maintain its ability to receive and remove moisture from contacting fruit surfaces, during repeated contacts with the fruit.

17. A process of removing moisture from the surfaces of fruit and the like which includes the step of supporting and rolling fruit by contact with angularly related, non-absorbent surfaces moving along simple, fixed paths to transfer moisture from fruit surfaces to said moving surfaces in free form, passing said moving surfaces into a moisture removing zone after each contact with fruit, wiping moisture from said surfaces in said zone after contact with said fruit, and then returning said surfaces into substantially moisture free state into further supporting and rolling contact with said fruit.

ALBERT R. THOMPSON.